(12) United States Patent
Cattoni et al.

(10) Patent No.: US 9,788,320 B2
(45) Date of Patent: Oct. 10, 2017

(54) SCANNING SECONDARY CELLS IN CELLULAR COMMUNICATIONS SYSTEM

(75) Inventors: Andrea Cattoni, Nibe (DK); Gustavo Wagner, Hamburg (DE); Claudio Rosa, Randers (DK); Frank Frederiksen, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 38 days.

(21) Appl. No.: 14/408,002

(22) PCT Filed: Jun. 15, 2012

(86) PCT No.: PCT/EP2012/061419
§ 371 (c)(1),
(2), (4) Date: Mar. 27, 2015

(87) PCT Pub. No.: WO2013/185835
PCT Pub. Date: Dec. 19, 2013

(65) Prior Publication Data
US 2015/0223241 A1    Aug. 6, 2015

(51) Int. Cl.
*H04W 4/00* (2009.01)
*H04W 72/04* (2009.01)
*H04W 48/16* (2009.01)
*H04L 5/00* (2006.01)
(Continued)

(52) U.S. Cl.
CPC ....... *H04W 72/0453* (2013.01); *H04L 5/0044* (2013.01); *H04L 5/0057* (2013.01); *H04L 5/0098* (2013.01); *H04W 48/16* (2013.01); *H04W 72/0413* (2013.01); *H04L 1/0026* (2013.01); *H04L 1/0027* (2013.01); *H04L 5/001* (2013.01); *H04L 5/0064* (2013.01); *H04L 5/143* (2013.01); *H04L 5/1469* (2013.01)

(58) Field of Classification Search
CPC .......... H04W 72/0453; H04W 72/0413; H04L 5/0057
USPC .................................................. 370/310–350
See application file for complete search history.

(56) References Cited

U.S. PATENT DOCUMENTS

| | | | | |
|---|---|---|---|---|
| 2011/0275385 A1* | 11/2011 | Escolar-Piedras | .... | H04W 64/00 455/456.1 |
| 2015/0031377 A1* | 1/2015 | Charbit | ................ | H04W 48/08 455/450 |
| 2016/0227519 A1* | 8/2016 | Nimbalker | ............ | H04L 5/0094 |

FOREIGN PATENT DOCUMENTS

| | | |
|---|---|---|
| WO | WO 2010/045019 A2 | 4/2010 |
| WO | WO 2012/047144 A1 | 4/2012 |
| WO | WO 2010045019 A2 * | 4/2012 |

OTHER PUBLICATIONS

TDD HeNB Synchronization with Macro Layer eNB, Jun. 25, 2009.*

(Continued)

*Primary Examiner* — Ricky Ngo
*Assistant Examiner* — Wei-Po Kao
(74) *Attorney, Agent, or Firm* — Harrington & Smith (57) ABSTRACT

A method, apparatus, and computer program for scanning for a secondary cell are provided. According to an embodiment, an apparatus operates in a primary cell of a cellular communication system, wherein the primary cell includes a primary component carrier associated with a bandwidth. The apparatus synchronizes scanning for a candidate secondary cell to radio transmissions in the primary cell, the secondary cell including a secondary component carrier expanding bandwidth beyond the bandwidth of the primary cell.

18 Claims, 5 Drawing Sheets

(51) Int. Cl.
    *H04L 5/14* (2006.01)
    *H04L 1/00* (2006.01)

(56) References Cited

OTHER PUBLICATIONS

3GPP TSG RAN WG1 #55-bis Meeting Ljubljana, Slovenia, Jan. 12-16, 2009, R1-090235, "Use of Background Interference Matrix for Autonomous Component Carrier Selection for LTE-Advanced", Nokia Siemens Networks, Nokia, 7 pgs.
3GPP TSG RAN WG4 Meeting #5 ibis, Los Angeles, USA, Jun. 29-Jul. 2, 2009, R4-092158, "TDD HeNB synchronization with marco layer eNB", Nokia Siemens Networks, Nokia, 5 pgs.
Liang, Y-C, et al., "Cognitive radio networking and communications: an overview", Vehicular Technology, IEEE Transactions on (vol. 60, Issue 7), published Jun. 6, 2011, abstract, 1 pg.
Lichun Bao and Shengui Liao; "Scheduling HeterogeneousWireless Systems for Efficient Spectrum Access"; EURASIP Journal onWireless Communications and Networking, vol. 2010, 14 pages.
RP-111354; Intel Corporation, Vodafone; "New Study Item Proposal for Radio Level Dynamic Flow Switching between 3GPP-LTE and WLAN"; 3GPP TSG RAN#53; Fukuoka, Japan, Sep. 13-16, 2011.

\* cited by examiner

SCANNING SECONDARY CELLS IN CELLULAR COMMUNICATIONS SYSTEM

FIELD

The invention relates to the field of radio communications and, particularly, to scanning frequency bands for a secondary cell.

BACKGROUND

Within the 3$^{rd}$ Generation Partnership Project (3GPP) specifying modern cellular communication systems, usage of additional bands for a carrier aggregation (CA) configuration has raised interest. The basic idea behind this concept is to expand bandwidth of a cellular network by accessing additional frequency bands that may be unlicensed/license-exempt. The cellular communication system may thus employ a primary cell (PCell) comprising a primary carrier on its licensed frequency band and create a new carrier on such an additional frequency band as a secondary cell (SCell).

BRIEF DESCRIPTION

According to an aspect of the present invention, there is provided a method as specified in claim 1.

According to another aspect of the present invention, there is provided an apparatus comprising at least one processor; and at least one memory including a computer program code, wherein the at least one memory and the computer program code are configured, with the at least one processor, to cause the apparatus to operate in a primary cell of a cellular communication system, wherein the primary cell comprises a primary component carrier associated with a bandwidth; synchronize scanning for a candidate secondary cell to radio transmissions in the primary cell, the secondary cell comprising a secondary component carrier expanding bandwidth beyond the bandwidth of the primary cell; determine a timing of a silent sub-frame in the primary cell; carry out procedures of the scanning for the candidate secondary cell during the timing of the silent sub-frame; scan a frequency band of the secondary cell and determine whether the frequency band is free or busy during said scanning; upon determining that the frequency band of the secondary cell is free, cause transmission of a reference signal on the frequency band; and acquire a channel quality indicator related to the reference signal.

According to yet another aspect of the present invention, there is provided a computer program product embodied on a computer readable distribution medium non-transitory computer-readable memory medium that stores program instructions, the execution of which result in performing operations for enabling self-organizing flexible spectrum use, the operations comprising operating in a primary cell of a cellular communication system, wherein the primary cell comprises a primary component carrier associated with a bandwidth; synchronizing scanning for a candidate secondary cell to radio transmissions in the primary cell, the secondary cell comprising a secondary component carrier expanding bandwidth beyond the bandwidth of the primary cell; determining a timing of a silent sub-frame in the primary cell; carrying out procedures of the scanning for the candidate secondary cell during the timing of the silent sub-frame; scanning a frequency band of the secondary cell and determining whether the frequency band is free or busy; upon determining that the frequency band of the secondary cell is free, causing transmission of a reference signal on the frequency band; and acquiring a channel quality indicator related to the reference signal.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
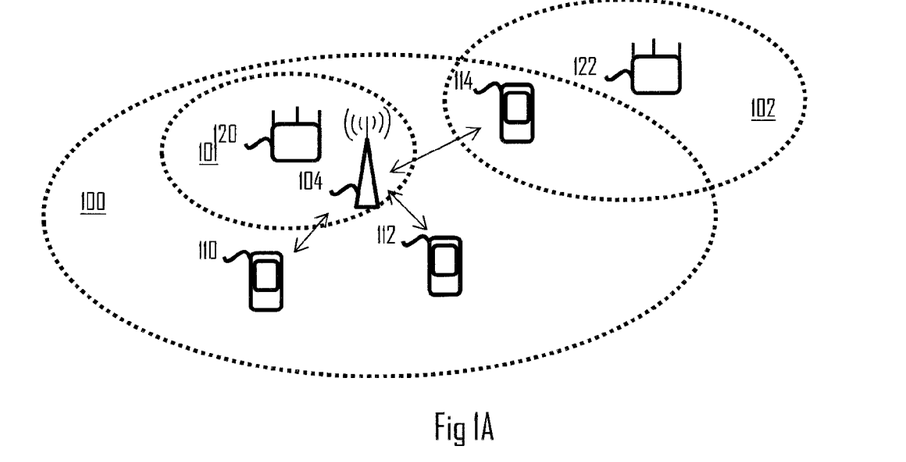
FIGS. 1A and 1B illustrate an embodiment of a wireless system to which embodiments of the invention may be applied.
Figure 1B:
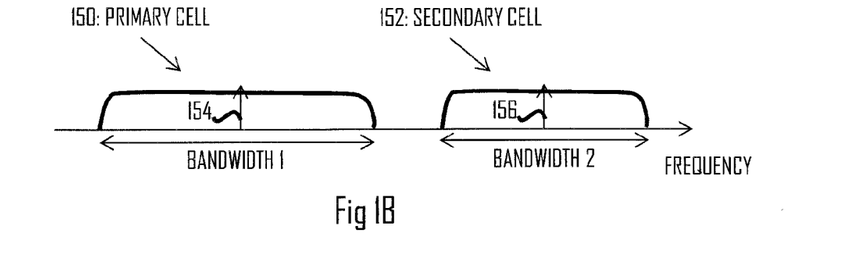

A general architecture of a cellular communication system providing voice and data transfer services to mobile terminals is illustrated in FIG. 1A, and an example of frequency band utilization is shown in FIG. 1B. The cellular communication system may be Universal Mobile Telecommunication System (UMTS) or any one of its evolution versions, e.g. Long-Term Evolution (LTE) or LTE-Advanced. However, the principles described herein may be applied to other cellular communication systems directly or with minor modifications obvious to a person skilled in the art.

Referring to FIG. 1A, the cellular communication system comprises one or more base stations 104 providing the system with radio coverage. The base stations 104 form a radio access network of the system by providing user terminals 110, 112, 114 with radio connections and access to other networks, e.g. the Internet, and other user terminals. The base stations 104 may employ each form a primary cell (PCell), and the base stations 104 may provide additional capacity by expanding the operational band to a secondary cell (SCell). Referring to FIG. 1B, the PCell 150 may comprise a primary component carrier 154 having a determined bandwidth, e.g. 20 Megahertz. The SCell 152 may comprise a secondary component carrier 156 having a second, bandwidth, wherein the bands of the primary component carrier 154 and the secondary component carrier 156 may be non-overlapping. The SCell may operate at least partly on frequency bands that are not licensed directly to the cellular communication system. Such frequency bands may comprise unlicensed frequency bands, e.g. an industrial, scientific, and medical (ISM) band. It should be noted that the radio access technologies used for the PCell and SCell may be different from each other. Other wireless networks may operate on such unlicensed frequency bands. Such networks may comprise IEEE 802.11 networks represented by access points 120, 122 in FIG. 1A. The coverage area 100 of the base station 104 may overlap with coverage areas 101, 102 of the access points 120, 122 completely or partially, as shown in FIG. 1A. In case of completely overlapping coverage areas 100, 101, the access point 120 is typically visible to the base station 104 in the sense that they are able to detect each other's transmissions. However, in case of partially overlapping coverage areas 100, 102, the access point 122 may be a "hidden node" in the sense that it may not detect the base station 104 and/or vice versa.

Figure 2:
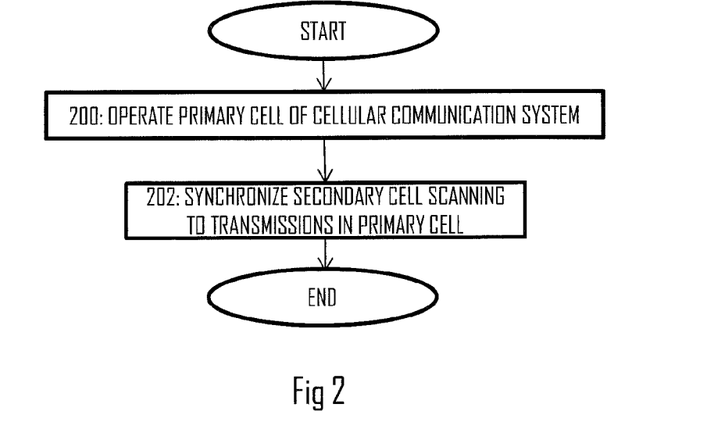
FIG. 2 illustrates an embodiment of a flow diagram of a process for carrying out scanning for secondary cells according to an embodiment of the invention.

In preparation for configuring the SCell, the base station 104 controlling communications within its coverage area 100 known as a cell may first carry out a scanning procedure on frequencies that are candidates for the SCell and the secondary component carrier. The scanning may in principle be carried out by the base station 104 itself and/or one or more of the user terminals 110 to 114 served by the base station 104. FIG. 2 illustrates a generic embodiment for carrying out such scanning. The process may be embodied in the user terminal 110 to 114 or in the base station 104. Referring to FIG. 2, the primary cell of a cellular communication system is operated in block 200. Block 200 may comprise transmitting and/or receiving radio signals in radio resources of a primary component carrier of the primary cell, e.g. the primary component carrier 154 of the primary cell 150. In block 202, scanning for a candidate secondary cell is synchronized to radio transmissions in the primary cell. Below, some embodiments related to the manner in which the synchronization may be carried out are described. Synchronizing the scanning for the SCell to the transmissions in the PCell enables controlled operation between the radio transmissions and the scanning. As a consequence, interference between the scanning and the radio transmissions may be reduced.

Figure 3:
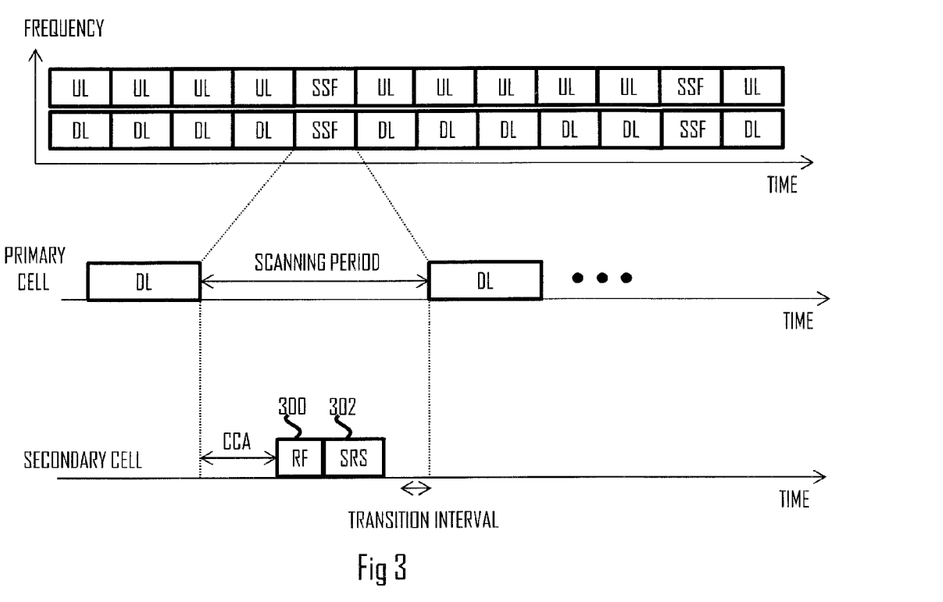
FIGS. 3 and 4 illustrate embodiments for configuring a scanning period in an FDD system and in a TDD system according to some embodiments of the invention.
Figure 4:
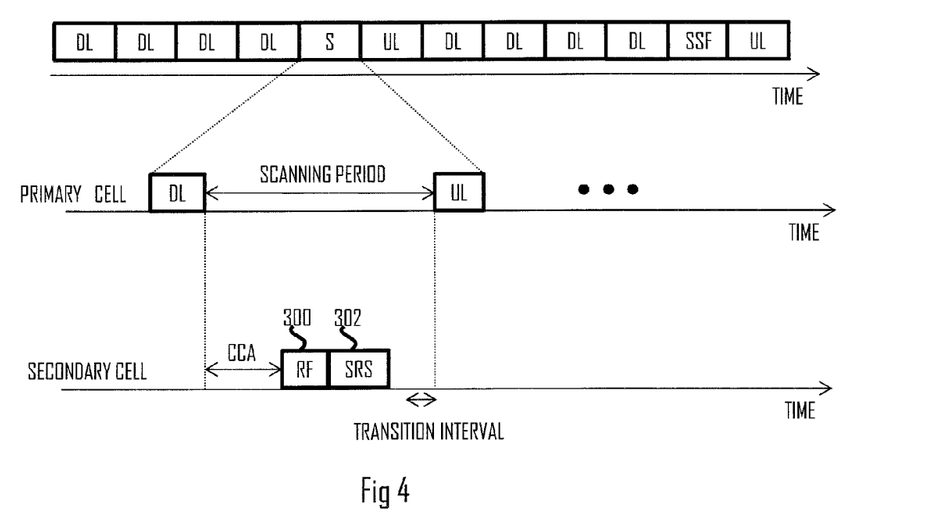

The transmissions in the PCell may be carried out in frames comprising a plurality of sub-frames. In an embodiment, a silent sub-frame is configured amongst the sub-frames. The silent sub-frame may be defined as a time period in which there is no radio transmission in the PCell. As a consequence, an apparatus carrying out the process of FIG. 2 may determine a timing of such a silent sub-frame in the primary cell and carry out procedures of the scanning for the candidate secondary cell during the timing of the silent sub-frame. FIGS. 3 and 4 illustrate embodiments of carrying out the scanning during the silent sub-frame. FIG. 3 illustrates the operation in a frequency-division-duplexed (FDD) system, while FIG. 4 illustrates the operation in a time-division-duplexed (TDD) system. As known in the art, FDD refers to a transmission scheme where uplink and downlink transmissions are separated in a frequency domain, while TDD refers to a transmission scheme where uplink and downlink transmissions are separated in a time domain. As a consequence, in the FDD scheme the uplink and downlink communication directions occupy different frequency bands but may operate simultaneously, while in the TDD scheme the uplink and downlink communication directions occupy the same frequency band and may operate alternately.

Referring to FIG. 3, a first frequency band of the PCell provides frequency resources for the uplink communications, while a second frequency band of the PCell provides frequency resources for the uplink communications, as shown in the upper portion of FIG. 3. The silent sub-frame (SSF) may be allocated to the same time interval on both frequency bands, thus realizing a non-transmission interval in the PCell. This non-transmission interval is used as a scanning period (see middle of FIG. 3) during which at least one candidate frequency band for the SCell is scanned by a scanning device which may be the base station 104 or the user terminal 110 to 114. The scanning procedures may comprise tuning the scanning device to a frequency band that is to be scanned, scanning the frequency band, and determining whether the frequency band is free or busy. The scanning may comply with a clear channel assessment (CCA) process of IEEE 802.11 networks in which the scanning device determines whether or not the frequency band contains radio energy that exceeds a predetermined threshold level. If the radio energy exceeding the threshold is detected, the frequency band is assumed to be busy, while if no radio energy exceeding the threshold is detected, the frequency band is assumed to be free. Upon determining that the frequency band of the secondary cell is free, the scanning device is configured to transmit a reference signal on the frequency band. The reference signal may be a sounding reference signal (SRS) 302 of the cellular communication system. The reference signal may be used as a pilot signal for channel estimation on the frequency band. A receiver receiving the reference signal may estimate a channel quality or channel state from the reference signal, and the utilization of the frequency band as the SCell may be configured on the basis of the estimated channel state.

In an embodiment, the scanning procedures comprise transmission of a channel reservation frame (RF) 300 before the reference signal 302. The channel reservation frame may be transmitted when the frequency band is determined to be free on the basis of the CCA. Additionally, the scanning device may carry out channel contention used in IEEE 802.11 networks where a transmitting device attempting to access a channel carries out a backoff computation before gaining a transmission opportunity. If the channel is free for the duration until the backoff computation ends, the transmitting device gains the transmission opportunity. The channel reservation frame 300 may be used to reserve the channel for a determined duration, e.g. duration specified in the channel reservation frame 300, and detection of the channel reservation frame 300 in any receiving device suspends the channel access in the receiving device for the determined duration. Thus, the channel reservation frame silences the devices detecting the channel reservation frame 300 and, thus, proactively reduces the chance of colliding transmissions on the frequency band. After the scanning device has reserved the channel, it may transmit the reference signal 302.

In an embodiment, the channel reservation frame 300 is a clear-to-send (CTS) frame of the IEEE 802.11 networks. In an embodiment, the CTS frame is a CTS-to-self frame addressed to the transmitter of the CTS frame, e.g. the scanning device.

A guard interval may be arranged at the end of the scanning period to enable the devices utilizing the PCell, e.g. the scanning device, to tune back to the frequency of the PCell. In FIGS. 3 and 4, this guard interval is denoted as a transition interval.

In the TDD system illustrated in FIG. 4, the operation of the scanning device during the scanning period may be the same or substantially similar to the operation in the FDD system. The silent sub-frame or a silent period may be provided in a boundary between uplink and downlink transmission time intervals, as shown in FIG. 4. In an embodiment, a downlink sub-frame is followed by the silent sub-frame, and the silent sub-frame is followed by an uplink sub-frame.

In an embodiment, the silent sub-frame in the TDD system is a special sub-frame (S sub-frame) of the TDD-LTE system. The special sub-frame may be sub-frame 1 in every uplink-downlink configuration, and sub-frame 6 in some uplink-downlink configurations, and it may contain a portion of downlink transmission at the start of the sub-frame (a Downlink Pilot Time Slot, DwPTS), a portion of unused symbols in the middle of the sub-frame (a guard period) and a portion of uplink transmission at the end of the sub-frame (an Uplink Pilot Time Slot, UpPTS), as shown in FIG. 4. The scanning period may be limited to the guard period and, therefore, the scanning period may be shorter than in the FDD system, provided that the sub-frame lengths are equal or substantially equal. In an embodiment, the maximum duration of the scanning period is seven symbols equalling to 497 microseconds (µs) in the TDD-LTE system and one transmission time interval (TTI) equalling to one millisecond or one sub-frame equalling to 497 µs in the FDD-LTE system.

The scanning period may utilize one symbol for the transition interval and one symbol for transmitting the reference signal. The symbols may be multi-carrier symbols comprising a plurality of sub-symbols, e.g. an orthogonal frequency division multiplexing (OFDM) symbol or a single-carrier frequency division multiplexing (SC-FDMA) symbol. The remaining period is available for carrying out the CCA. If the system to be used in the SCell is a TDD-LTE/LTE-LAN (Local Area Network), the scanning period may comprise one forcedly silent symbol for the transition interval, one symbol for sending the channel reservation frame 300, and one symbol for transmitting the reference signal. If the system to be used in the SCell is an IEEE 802.11 system, the scanning period may comprise, instead of or in addition to the use of the reference signal, a calibration/sounding procedure available in 802.11n networks for adaptive modulation and coding and/or for multi-antenna transmission schemes (MIMO) or its derivative. Furthermore, the scanning period may comprise at least one symbol for the CCA, and at least one symbol for the transition interval.

Figure 5:
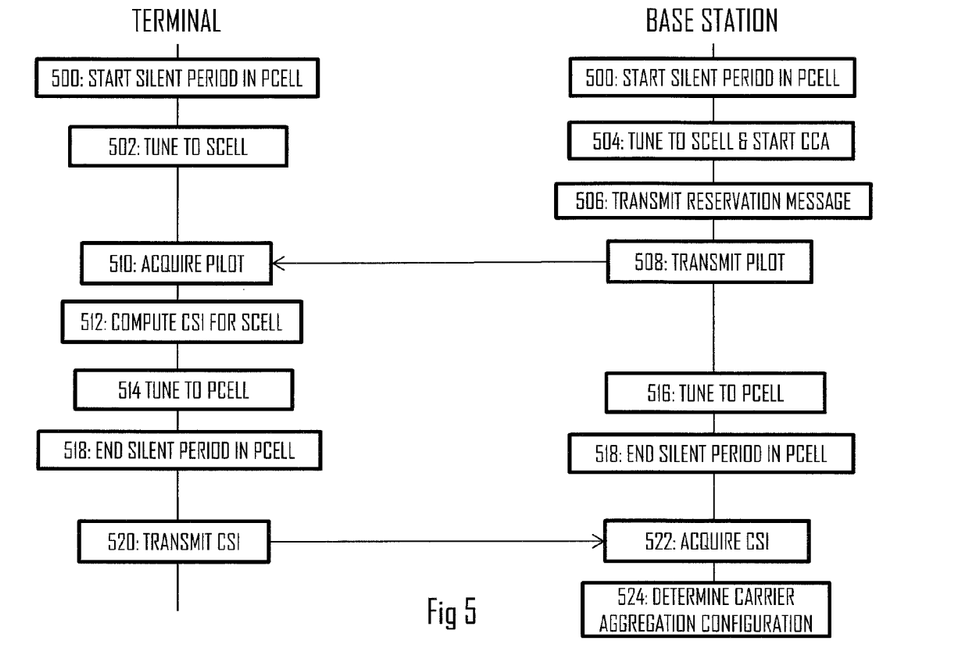
FIG. 5 illustrates a signalling diagram of the operation of a user terminal and a base station during the scanning period according to an embodiment of the invention.

Let us now refer to a signalling diagram of FIG. 5 illustrating the operation of the user terminal and the base station during the scanning period. In this embodiment, the base station is the scanning device. Let us assume an initial state where the base station has configured the Pcell, and the base station and the user terminal communicate with each other over frequency resources of a primary component carrier of the PCell. In block 500, a silent period is triggered in the PCell for the duration of the above-mentioned silent sub-frame, for example. In block 502, the user terminal tunes its radio receiver from the frequency band of the PCell to a frequency band of a candidate SCell. The frequency band of the candidate SCell may be static or semi-static, and it may be indicated by the base station to the user terminal as a part of system information, for example. In block 504, the base station tunes its radio receiver to the same frequency band of the candidate SCell and starts the CCA procedure. Let us assume that the frequency band of the candidate SCell is detected to be free and, thus, the base station transmits the channel reservation message 300 in block 506. As a consequence, any device detecting the channel reservation message suspends its transmissions on the frequency band. However, there may be some hidden nodes, e.g. node 122 that did not detect the channel reservation message.

In block 508, the base station transmits the reference signal 302, e.g. a pilot signal, and the user terminal acquires the reference signal in block 510. In block 512, the user terminal computes the channel state of the SCell. Block 512 may also comprise estimating interference caused by the hidden nodes. The interference estimation may comprise estimating a signal-to-interference power ratio (SIR) or another corresponding metric proportional to the interference caused by nodes other than the transmitter of the reference signal.

In blocks 514 and 516, the user terminal and the base station tune to the frequency of the PCell, respectively, during the transition interval, and the silent period is ended in block 518. In block 520, the user terminal transmits a channel state indicator (CSI) to the base station in uplink control resources of the PCell, and the base station acquires the CSI in block 522. On the basis of the CSI received from the user terminal and, possibly, from other user terminals, the base station may determine a carrier aggregation configuration for the scanned SCell in block 524. For example, block 524 may comprise determining whether or not to expand frequency resources of the base station to the candidate SCell frequencies. Upon determining to expand the resources, the base station may configure establishment of a secondary component carrier onto the scanned frequency band of the candidate SCell, thus creating the SCell. In another example, the base station may decide to change at least some of the parameters of an operational SCell on the basis of the scanning and/or the received CSIs.

Figure 6:
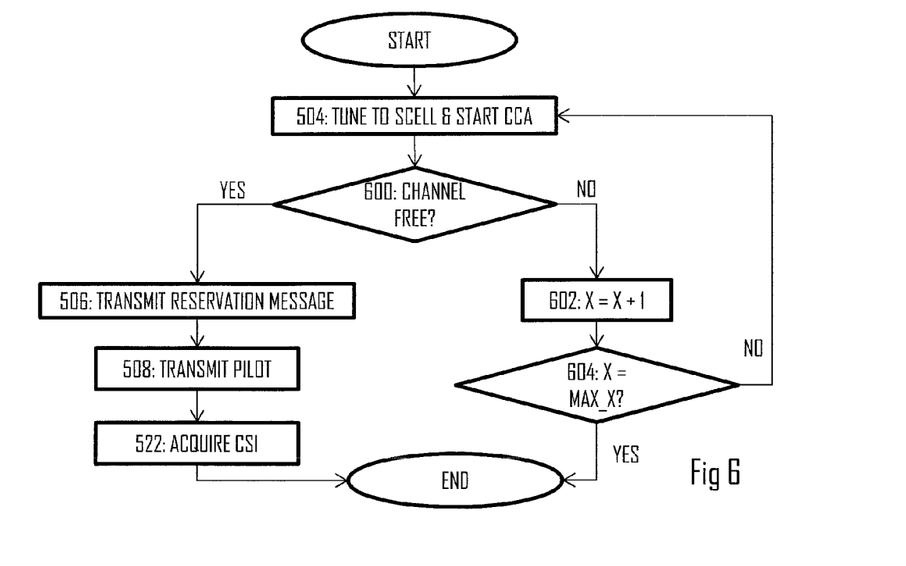
FIG. 6 illustrates a detailed flow diagram of operation of a scanning device during the scanning period according to an embodiment of the invention.

FIG. 6 illustrates a flow diagram of medium access control (MAC) operation of the scanning device during the scanning period according to an embodiment of the invention. Referring to FIG. 6, the scanning device starts the silent period, tunes to the frequency band of the SCell, and starts the CCA in block 504. In block 600, a decision is made on the basis of the CCA. If the frequency band (channel) is detected to be busy, the process proceeds to block 602. The decision of block 600 may be made symbol-by-symbol. In block 602, a symbol counter is incremented by one symbol. The symbol counter may count for the maximum duration of the scanning period before returning to the PCell. The counting may be carried out by increments of one symbol duration. In block 604, if the symbol counter has reached its maximum value (MAX_X), the process ends with the outcome that the SCell was busy for the whole duration of the scanning period. On the other hand, if the symbol counter has not yet reached its maximum value (MAX_X), the process returns to block 504, and the CCA continues.

If the channel is determined to be free in block 600, the process proceeds to block 506 in which the scanning device reserves the channel by transmitting the channel reservation message 300. In block 508, the scanning device transmits the reference signal 302 during the reservation, and in block 516 the scanning device acquires the CSI for the transmitted reference signal. In an embodiment, the CSI is acquired after the transition back to the PCell, while in another embodiment the CSI is acquired while still in the SCell. In the former embodiment, the CSI is thus transmitted in the frequency resources of the PCell, while in the latter embodiment the CSI is transferred over the SCell frequency resources.

Figure 7:
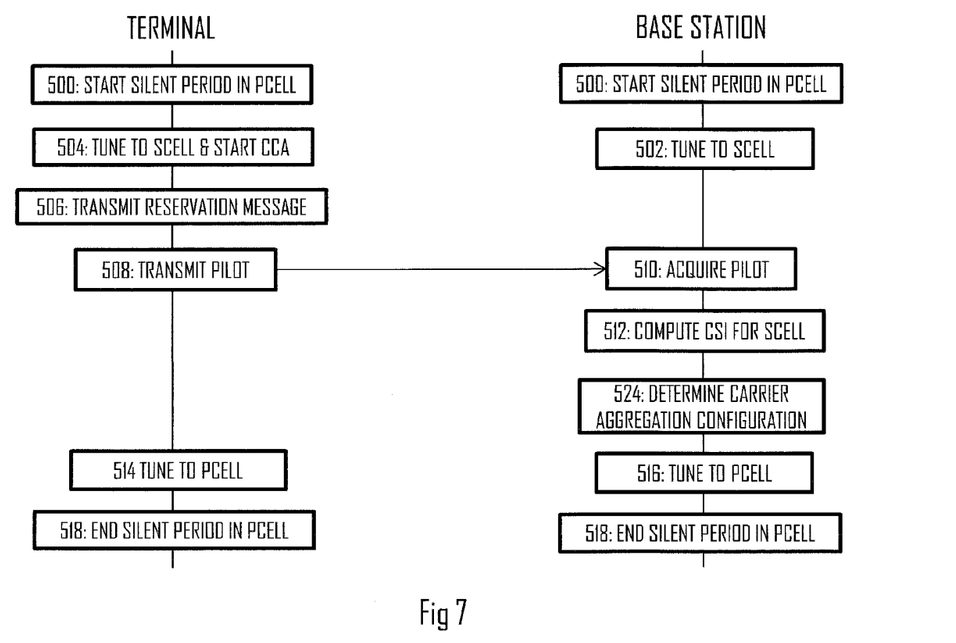
FIG. 7 illustrates a signalling diagram of the operation of the user terminal and the base station during the scanning period according to another embodiment of the invention.

FIG. 7 illustrates another embodiment where the user terminal is the scanning device. FIG. 7 illustrates the same operations as described above in connection with FIG. 5 and FIG. 6, but the entity carrying out some of the steps is different from the embodiments described above. Referring to FIG. 7, the user terminal and the base station start the silent period in the PCell in block 500. Now, the user terminal carries out block 504 with the CCA process, block 506 with the transmission of the channel reservation message 300, and block 508 with the transmission of the reference signal 302. The base station acquires the reference signal 302 in block 510 and computes the CSI and, optionally, the interference from the hidden nodes. Thereafter, the base station may carry out block 518 either during the scanning period or after the scanning period.

In the embodiments where the user terminal carries out the scanning as in FIG. 7, the user terminal may also carry out the process of FIG. 6 with the exception that block 516 may be omitted.

In yet another embodiment, the operations during the scanning procedure described above are distributed between the base station and the user terminal. For example, the base station 104 may be configured to carry out the CCA and the transmission of the channel reservation message. However, the channel reservation message may define that the channel has been reserved for the user terminal. The channel reservation message may comprise an identifier of the user terminal to indicate the device for which the channel is reserved. Upon detecting the channel reservation message 300 and its own identifier in the channel reservation message 300, the user terminal may carry out the transmission of the reference signal 302 on the reserved frequency band.

Figure 8:
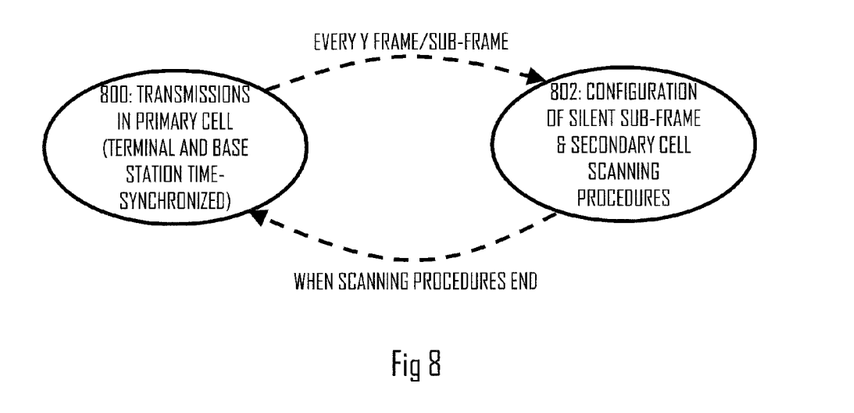
FIG. 8 illustrates a state transition diagram for synchronizing the operation in a primary cell and the scanning procedure according to an embodiment of the invention.

FIG. 8 illustrates the operation of the user terminal 110 to 114 and the base station 104 as a state diagram. Block 800 presents regular configuration of the PCell operations, e.g. transmissions in the frequency resources of the PCell. Block 802 presents the operation during the scanning period, e.g. channel sounding on the frequency band of the SCell. Clocks of the user terminals 110 to 114 and the base station 104 may be synchronized at least coarsely such that they may both trigger the transition from block 800 to block 802 and from block 802 to block 800 substantially at the same time. The transition at least from block 800 to block 802 may be periodic. In an embodiment, a special configuration of a frame or a sub-frame is used in order to perform the sounding procedure. The special configuration may be the configuration of the silent sub-frame or the silent period in the transmissions in the Pcell. The periodicity of the special configuration may be considered to make a tradeoff between the sounding needs and the capacity loss given by silencing the data transmission in the Pcell for allowing the procedure. After every attempt of performing the sounding in block 802, the frame configuration may return to regular procedure of block 800.

Figure 9:
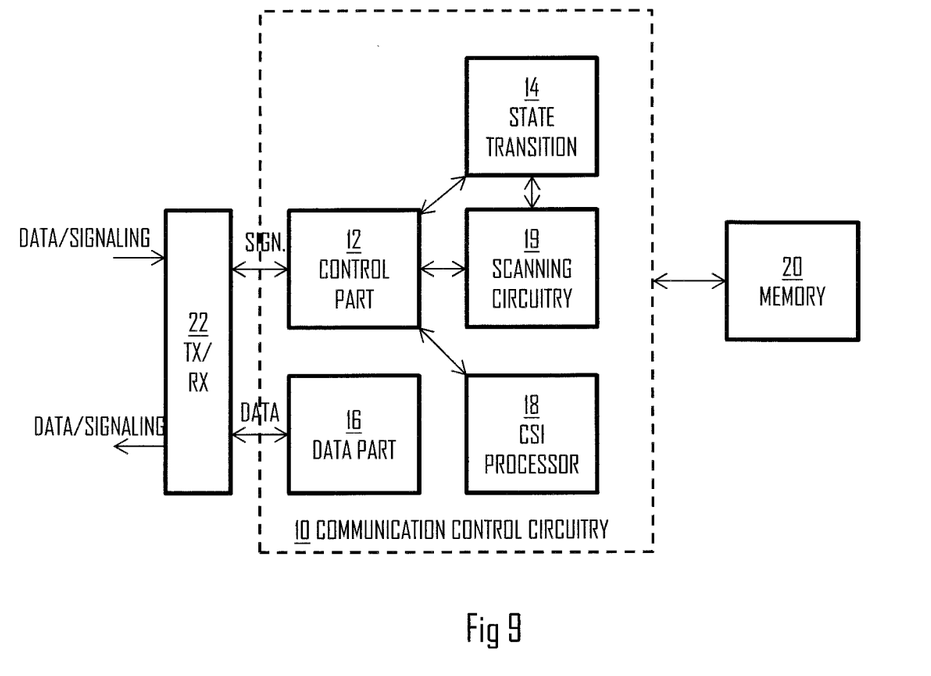
FIG. 9 illustrates a block diagram of a structure of an apparatus configured to carry out embodiments of the invention.

FIG. 9 illustrates an embodiment of an apparatus comprising means for carrying out the above-mentioned functionalities. The apparatus may be a wireless apparatus which complies with specifications of a cellular communication system defined above or another wireless network. The wireless apparatus may also be a cognitive radio apparatus capable of adapting its operation to a changing radio environment, e.g. to changes in parameters of another system on the same frequency band. The wireless apparatus may support carrier aggregation. In embodiments where the wireless apparatus is comprised in a user terminal, the wireless apparatus may be or may be comprised in a computer (PC), a laptop, a tablet computer, a cellular phone, a palm computer, or any other apparatus provided with radio communication capability. In another embodiment, the wireless apparatus is comprised in a base station. According to another aspect, the apparatus carrying out the above-described functionalities is comprised in such a wireless apparatus, e.g. the apparatus may comprise a circuitry, e.g. a chip, a processor, a micro controller, or a combination of such circuitries in the wireless apparatus.

Referring to FIG. 9, the apparatus may comprise a communication controller circuitry 10 configured to control wireless communications in the wireless apparatus. The communication controller circuitry 10 may comprise a control part 12 handling control signalling communication with respect to transmission, reception, and extraction of control messages including the CSI reports, the channel reservation messages, and the reference signals, as described above. The control part 12 may be a multi-mode device operating according to the specifications of the cellular communication system and, additionally, according to specifications of another system primarily operating on outside the licensed cellular frequencies, e.g. the IEEE 802.11. The communication controller circuitry 10 may further comprise a data part 16 that handles transmission and reception of payload data in the frequency resources of the PCell and/or SCell(s).

The communication controller circuitry 10 may further comprise a state transition circuitry 14 configured to switch an operational state of the apparatus between the PCell operation (block 800) and the scanning for the SCell(s) (block 802). Upon triggering the scanning, the state transition circuitry 14 may configure the control part 12 to tune into the SCell frequencies and activate a scanning circuitry 19 to carry out the scanning procedures according to any one of the above-described embodiments. Depending on the embodiment, the scanning circuitry 19 may be configured to carry out at least some of the following procedures in the SCell frequency band: the CCA, the transmission of the channel reservation message 300, and the transmission of the reference signal 302. The state transition circuitry 14 may comprise a counter counting the sub-frame numbers and/or the duration of the scanning period for the state transition purposes.

The communication control circuitry 10 may further comprise a CSI processor circuitry 18 configured to process CSIs. In an embodiment where the apparatus acquires the reference signal transferred on the SCell frequency band, the CSI processor may compute the CSI and, optionally, the interference estimate. Then, if the apparatus is comprised in the user terminal, the CSI processor circuitry 18 may output the CSI to the control part 12 and the control part 12 may transmit the CSI to the base station. If the apparatus is comprised in the base station, the CSI processor circuitry 18 may output the CSI to a carrier aggregation controller (not shown) configured to determine the carrier aggregation configurations in the base station. In another embodiment where the apparatus is comprised in the base station and where the CSI is acquired from one or more user terminals, the CSI processor circuitry 18 may process the received CSI and output the CSI to the carrier aggregation controller circuitry.

The circuitries 12 to 19 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 19 or all of them.

The apparatus may further comprise the memory 20 that stores computer programs (software) configuring the apparatus to perform the above-described functionalities of the wireless apparatus. The memory 20 may also store communication parameters and other information needed for the wireless communications and in the scanning procedure. The apparatus may further comprise radio interface components 22 providing the apparatus with radio communication capabilities within the PCell and in one or more SCells. The radio interface components 22 may comprise standard well-known components such as an amplifier, filter, frequency-converter, (de)modulator, and encoder/decoder circuitries and one or more antennas. In the embodiment where the apparatus is comprised in the user terminal, the apparatus may further comprise a user interface enabling interaction with the user of the communication device. The user interface may comprise a display, a keypad or a keyboard, a loudspeaker, etc.

In an embodiment, the apparatus carrying out the embodiments of the invention in the wireless apparatus comprises at least one processor and at least one memory including a computer program code, wherein the at least one memory and the computer program code are configured, with the at least one processor, to cause the apparatus to carry out the functionalities according to any one of the processes of FIGS. 2 to 8. Accordingly, the at least one processor, the memory, and the computer program code form processing means for carrying out embodiments of the present invention in the wireless apparatus.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 8 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable wireless networks. The protocols used, the specifications of wireless systems, their network elements and user terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
operating in a primary cell of a cellular communication system, wherein the primary cell comprises a primary component carrier associated with a bandwidth;
synchronizing scanning for a candidate secondary cell to radio transmissions in the primary cell, the secondary cell comprising a secondary component carrier expanding bandwidth beyond the bandwidth of the primary cell;
determining a timing of a silent sub-frame in the primary cell;
carrying out procedures of the scanning for the candidate secondary cell during the timing of the silent sub-frame;
scanning a frequency band of the secondary cell and determining whether the frequency band is free or busy;
upon determining that the frequency band of the secondary cell is free, causing transmission of a reference signal on the frequency band; and
acquiring a channel quality indicator related to the reference signal.

2. The method of claim 1, wherein the silent sub-frame is a guard period between uplink and downlink transmission time slots of a time-division-duplexed transmission scheme.

3. The method of claim 1, wherein the silent sub-frame is a periodic silent interval in a frequency-division-duplexed transmission scheme.

4. The method of claim 1, wherein the silent sub-frame is periodic, the method further comprising causing the scanning for the secondary cell to be a periodic procedure.

5. The method of claim 1, wherein the said scanning for the candidate secondary cell comprises:
scanning a frequency band of the secondary cell and determining whether the frequency band is free or busy;
upon determining that the frequency band of the secondary cell is free, causing transmission of a reference signal on the frequency band;
acquiring a channel quality indicator related to the reference signal; further comprising:
upon determining that the frequency band of the secondary cell is free, causing transmission of a reservation message reserving the at least some of the frequency band of the secondary cell; and
causing transmission of the reference signal during the reservation.

6. The method of claim 1, wherein the said scanning for the candidate secondary cell comprises:

scanning a frequency band of the secondary cell and determining whether the frequency band is free or busy;

upon determining that the frequency band of the secondary cell is free, causing transmission of a reference signal on the frequency band;

acquiring a channel quality indicator related to the reference signal, wherein said scanning and transmission of the reference signal are carried out by a base station of the cellular communication system, and said channel quality indicator is computed in a terminal device of the cellular communication system and communicated to the base station over an uplink control channel of the primary cell.

7. The method of claim 1, wherein the said scanning for the candidate secondary cell comprises:

scanning a frequency band of the secondary cell and determining whether the frequency band is free or busy;

upon determining that the frequency band of the secondary cell is free, causing transmission of a reference signal on the frequency band;

acquiring a channel quality indicator related to the reference signal, wherein said scanning and transmission of the reference signal are carried out by a terminal device of the cellular communication system, and said channel quality indicator is computed in a base station of the cellular communication system.

8. The method of claim 1, wherein the method is carried out in said terminal device, wherein the scanning for said secondary cell comprises measuring channel quality of the secondary cell during said scanning, further comprising:

reverting back to the primary cell after said scanning; and reporting measurement results to a serving base station of the primary cell.

9. An apparatus comprising:

at least one processor; and at least one memory including a computer program code, wherein the at least one memory and the computer program code are configured, with the at least one processor, to cause the apparatus to:

operate in a primary cell of a cellular communication system, wherein the primary cell comprises a primary component carrier associated with a bandwidth;

synchronize scanning for a candidate secondary cell to radio transmissions in the primary cell, the secondary cell comprising a secondary component carrier expanding bandwidth beyond the bandwidth of the primary cell;

determine a timing of a silent sub-frame in the primary cell;

carry out procedures of the scanning for the candidate secondary cell during the timing of the silent sub-frame;

scan a frequency band of the secondary cell and determine whether the frequency band is free or busy during said scanning;

upon determining that the frequency band of the secondary cell is free, cause transmission of a reference signal on the frequency band; and acquire a channel quality indicator related to the reference signal.

10. The apparatus of claim 9, wherein the silent sub-frame is a guard period between uplink and downlink transmission time slots of a time-division-duplexed transmission scheme.

11. The apparatus of claim 9, wherein the silent sub-frame is a periodic silent interval in a frequency-division-duplexed transmission scheme.

12. The apparatus of claim 9, wherein the silent sub-frame is periodic, the method further comprising causing the scanning for the secondary cell to be a periodic procedure.

13. The apparatus of claim 9, wherein the at least one memory and the computer program code are configured, with the at least one processor, to cause the apparatus to:

scan a frequency band of the secondary cell and determine whether the frequency band is free or busy during said scanning; upon determining that the frequency band of the secondary cell is free, cause transmission of a reference signal on the frequency band; and acquire a channel quality indicator related to the reference signal, and cause, upon determining that the frequency band of the secondary cell is free, transmission of a reservation message reserving the at least some of the frequency band of the secondary cell; and cause transmission of the reference signal during the reservation.

14. The apparatus of claim 9, wherein the at least one memory and the computer program code are configured, with the at least one processor, to cause the apparatus to:

scan a frequency band of the secondary cell and determine whether the frequency band is free or busy during said scanning;

upon determining that the frequency band of the secondary cell is free, cause transmission of a reference signal on the frequency band; and acquire a channel quality indicator related to the reference signal, wherein said scanning and transmission of the reference signal are carried out by a base station of the cellular communication system, and said channel quality indicator is computed in a terminal device of the cellular communication system and communicated to the base station over an uplink control channel of the primary cell.

15. The apparatus of claim 9, wherein the at least one memory and the computer program code are configured, with the at least one processor, to cause the apparatus to:

scan a frequency band of the secondary cell and determine whether the frequency band is free or busy during said scanning;

upon determining that the frequency band of the secondary cell is free, cause transmission of a reference signal on the frequency band; and acquire a channel quality indicator related to the reference signal, wherein said scanning and transmission of the reference signal are carried out by a terminal device of the cellular communication system, and said channel quality indicator is computed in a base station of the cellular communication system.

16. The apparatus of claim 9, wherein the method is carried out in said terminal device, wherein the at least one memory and the computer program code are configured, with the at least one processor, to cause the apparatus to:

measure channel quality of the secondary cell during said scanning, revert back to the primary cell after said scanning; and report measurement results to a serving base station of the primary cell.

17. The apparatus of claim 9, further comprising radio interface components providing the apparatus with radio communication capability.

18. A non-transitory computer-readable memory medium that stores program instructions, the execution of which result in performing operations for enabling self-organizing flexible spectrum use, the operations comprising:

operating in a primary cell of a cellular communication system, wherein the primary cell comprises a primary component carrier associated with a bandwidth;

synchronizing scanning for a candidate secondary cell to radio transmissions in the primary cell, the secondary cell comprising a secondary component carrier expanding bandwidth beyond the bandwidth of the primary cell;

determining a timing of a silent sub-frame in the primary cell;

carrying out procedures of the scanning for the candidate secondary cell during the timing of the silent sub-frame;

scanning a frequency band of the secondary cell and determining whether the frequency band is free or busy;

upon determining that the frequency band of the secondary cell is free, causing transmission of a reference signal on the frequency band; and acquiring a channel quality indicator related to the reference signal.

* * * * *